Aug. 13, 1957　　　O. K. HEINZE　　　2,802,709
PISTON RING
Filed Oct. 7, 1955
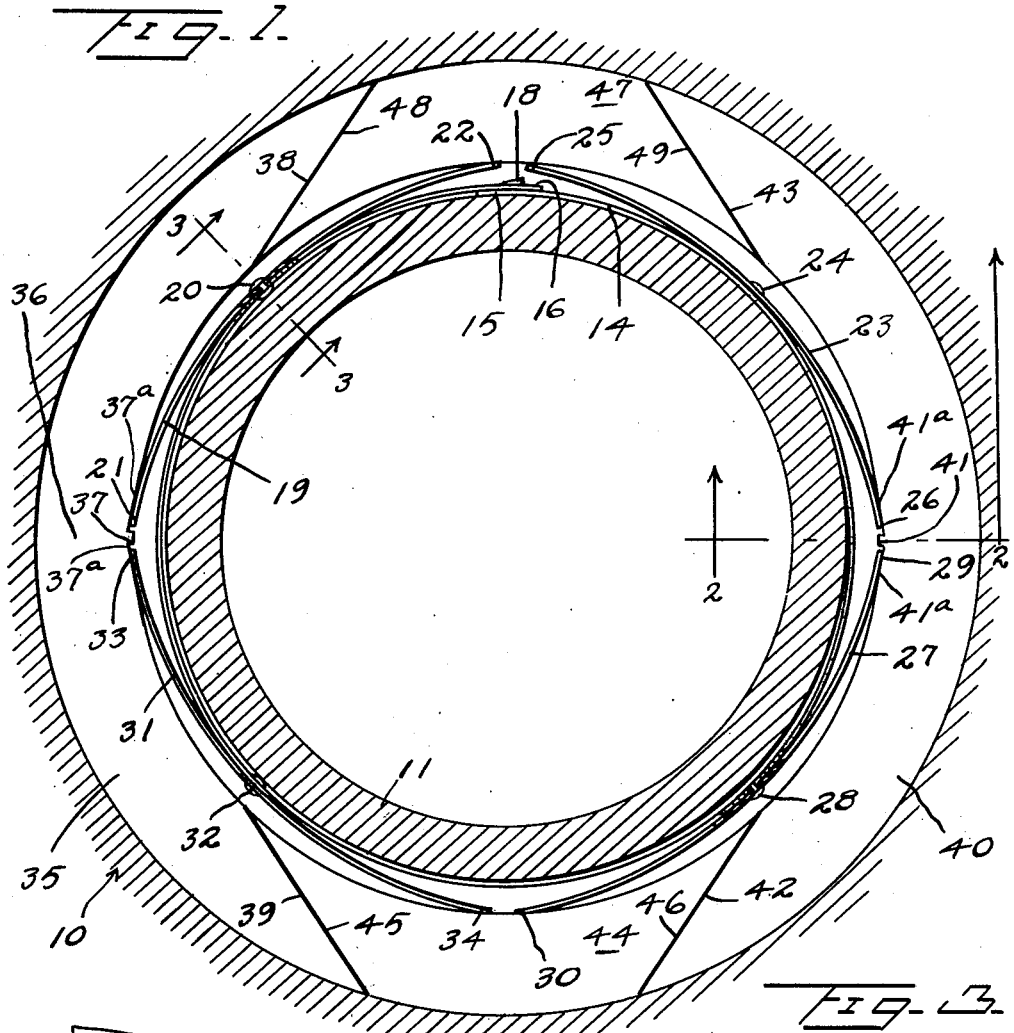
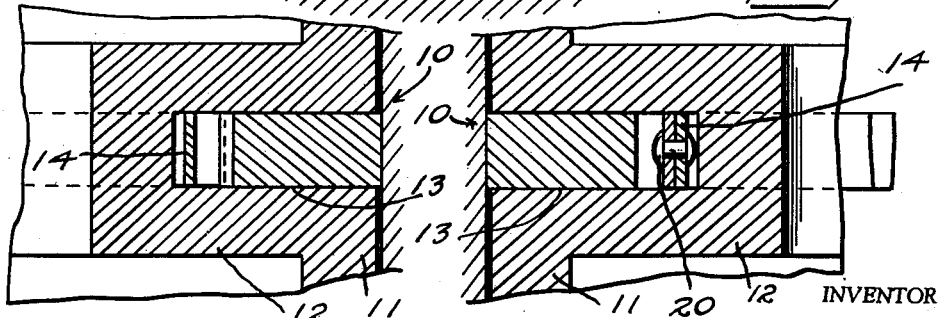
INVENTOR
O. K. Heinze
BY Kimmel & Crowell
ATTORNEYS

United States Patent Office 2,802,709
Patented Aug. 13, 1957

2,802,709

PISTON RING

Otto K. Heinze, Astoria, Oreg.

Application October 7, 1955, Serial No. 539,072

2 Claims. (Cl. 309—44)

The present invention relates to piston rings, and more particularly to multiple segment spring pressed rings.

The primary object of the invention is to provide a piston ring constructed so as to permit surface wear of the ring without decreasing the sealing qualities thereof.

Another object of the invention is to provide a piston ring of the class described which produces a more effective seal between the piston and the cylinder than is found in the prior art structures.

A further object of the invention is to provide a piston ring of the class described which will be inexpensive to manufacture, simple to install and trouble-free in operation.

Other objects and advantages will become apparent in the following specification when considered in the light of the attached drawing, in which:

Figure 1 is a top plan view of the piston ring shown installed in a piston, with the piston and cylinder illustrated in horizontal section;

Figure 2 is an enlarged fragmentary transverse section taken along the line 2—2 of Figure 1, looking in the direction of the arrows;

Figure 3 is an enlarged fragmentary transverse section taken along the line 3—3 of Figure 1, looking in the direction of the arrows, and Figure 4 is a fragmentary detail cross-section of the band locking mechanism.

Referring now to the drawings in detail, wherein like reference numerals indicate like parts throughout the several figures, the reference numeral 10 indicates generally a cylinder having a piston 11 positioned therein for reciprocation therein in the usual manner.

The piston 11 is provided with an internal annular flange 12 having an externally opening annular groove 13. The piston 11 may have any desired number of grooves 13 for purposes to be described.

A band 14 is seated at the base of the groove 13 and has its end 15 overlapped by its end 16. A prong 17 extends upwardly into a detent recess 18 to lock the band 14 in position on the piston 11. A flat spring 19 is positioned to overlie the band 14 and is secured at its center portion to the band 14 by means of a rivet 20. The spring 19 is formed so that the outer ends thereof 21 and 22 are biased to normally move in a direction away from the band 14. A flat spring 23 is secured at its center point to the band 14 by a rivet 24, with the spring 23 having its center point circumferentially spaced from the center point of the spring 19. The outer ends 25 and 26 of the spring 23 are biased to normally press outwardly away from the band 14. A flat spring 27 is secured at its center point to the band 14 by means of a rivet 28 with the center point of the spring 27 circumferentially spaced from the center points of the springs 19 and 23. The outer ends 29 and 30 of the spring 27 are normally biased to move in a direction away from the band 14. A flat spring 31 is secured at its center point to the band 14 by means of a rivet 32 and has its center point circumferentially spaced from the center points of the springs 19, 23 and 27.

The outer ends 33 and 34 of the spring 31 are normally biased in a direction away from the band 14.

A flat semi-circular ring segment 35 is positioned with its center point 36 equispaced from the center points of a pair of adjacent springs 19 and 31. A boss 37 is formed by a pair of opposed tapered recesses 37a so that the boss 37 extends radially inwardly from the body of the ring segment 35 to form a stop for the ends 21 and 33, respectively, of the springs 19 and 31 to engage. The outer ends of the ring segment 35 are tapered inwardly, as at 38 and 39, for purposes to be described. An identical ring segment 40 is positioned diametrically opposite to the ring segment 35 and is provided with a boss 41 formed by recesses 41a so that the boss 41 is extending radially inwardly from the body of the ring 40 to form a stop for the ends 26, 29 of the springs 23 and 27, respectively.

The spring ends 21 and 33 press against the ring segment 35 and bias it normally outwardly into engagement with the cylinder wall 10. Likewise the spring ends 26 and 29 of the springs 23 and 27, respectively, press outwardly against the ring segment 40 normally biasing it against the piston wall 10. The opposite ends of the ring segment 40 are inwardly tapered, as at 42 and 43. A somewhat smaller ring segment 44 is positioned between the ring segments 35 and 40 and is provided with outwardly tapered end walls 45 and 46 which are adapted to cooperate with inwardly tapered end walls 39 and 42, respectively, of the ring segments 35 and 40 in a manner to be described.

A second substantially smaller ring segment 47 is positioned diametrically opposite to the ring segment 44 and is likewise provided with outwardly tapered end walls 48 and 49 which are adapted to cooperate with the inwardly flared end walls 38 and 43 of the ring segments 35 and 40, respectively. The spring ends 30 and 34 of the flat springs 27 and 31 engage against the ring segment 44 normally urging it outwardly into engagement with the piston wall 10. The spring ends 22 and 25 of the springs 19 and 23, respectively, engage against the ring segment 47, normally biasing it outwardly against the piston wall 10.

In the use and operation of the invention, the piston ring is installed by placing the band 14 in the bottom of the ring groove 13 and locking the overlapped ends 15 and 16 thereof. The springs 19, 23, 27 and 31 are thus positioned in the groove 13 and extend outwardly therein. The ring segments 44 and 47 are then inserted so as to engage the spring ends 22, 25, 30 and 34, respectively, and the segments 35 and 40 are brought into engagement with the spring ends 21, 33 and 26, 29 respectively with the respective end edges thereof engaged with the respective end edges of the segments 44 and 47, the bosses 37 and 41 acting to prevent the segments from becoming disaligned with relation to the springs.

As the piston ring becomes worn away, the segments will move outwardly under the impetus of the springs accommodating for the wear and maintaining an effective seal over an extended period of time, perhaps for the complete life of the engine.

Having thus described the preferred embodiment of the invention, it should be understood that numerous modifications and structural adaptations may be resorted to without departing from the scope of the appended claims.

What is claimed is:

1. A piston ring adapted to be carried in an annular groove in a piston comprising, a band seated in the groove said band having a prong on one end and a detent recess on the other end for engagement by the prong to hold the band in place in the groove, a plurality of flat springs positioned around said band and secured at their mid points to said band, a plurality of ring segments having tapered ends, the tapered ends of each of said segments engaging the tapered ends on circumferentially positioned adjacent oppositely tapered segments, at least a pair of said tapered segments having on their inner sides bosses adapted to extend between the ends of pairs of flat springs to form stops for the ends of said flat springs.

2. The invention as claimed in claim 1 wherein the ends of the flat springs are bent into engagement with the inner side of the said ring segments to expand the ring segments into engagement with the wall of a cylinder.

References Cited in the file of this patent

UNITED STATES PATENTS 2,696,414     Green _____ Dec. 7, 1954